J. LANDAU

BRACKET DEVICE

June 14, 1932.

Re. 18,490

Original Filed Nov. 28, 1927

Inventor
JACOB LANDAU
BY:- Ben V. Zillman
Attorney

Reissued June 14, 1932 Re. 18,490

UNITED STATES PATENT OFFICE

JACOB LANDAU, OF JERSEY CITY, NEW JERSEY

BRACKET DEVICE

Original No. 1,771,682, dated July 29, 1930, Serial No. 236,268, filed November 28, 1927. Application for reissue filed July 1, 1931. Serial No. 548,230.

My invention relates to improvements in bracket devices, and has among its objects, the production of a device of such character, which shall be neat and attractive in appearance, simple in design and construction, convenient, fairly low in cost, sturdy, and efficient and satisfactory for use wherever found applicable.

One of the objects of my invention is to provide a bracket of the kind described, which although particularly intended for supporting an electric fan, yet may be used for supporting other devices such as electric heaters, telephones, electric lamps, etc., as well as artistic and ornamental objects such as flower pots, loud speakers, etc.

Another of the objects of my invention is to provide a device of the kind described, which may be securely mounted on a suitable wall surface, and which shall be provided with adjustably movable clips or similar means thereon, whereby the base of the electric fan or the like may be gripped or clamped to hold said object rigidly in place on the bracket, in the position or direction found most suitable.

A further object of my invention is to provide a bracket as above described, preferably out of sheet metal, finished or decorated in any desired manner so as to harmonize with the surroundings in which it is to be mounted, and reinforced with a brace of special shape, to hold the parts of the bracket together immovably, and in their desired relationship.

Many other objects and advantages of the construction herein shown and described, and uses mentioned, will be obvious to those skilled in the art to which this invention appertains, from the disclosures herein given.

To this end, my invention consists in the novel construction, arrangement and combination of parts herein shown and described, and more particularly pointed out in the claims.

Figure 1:
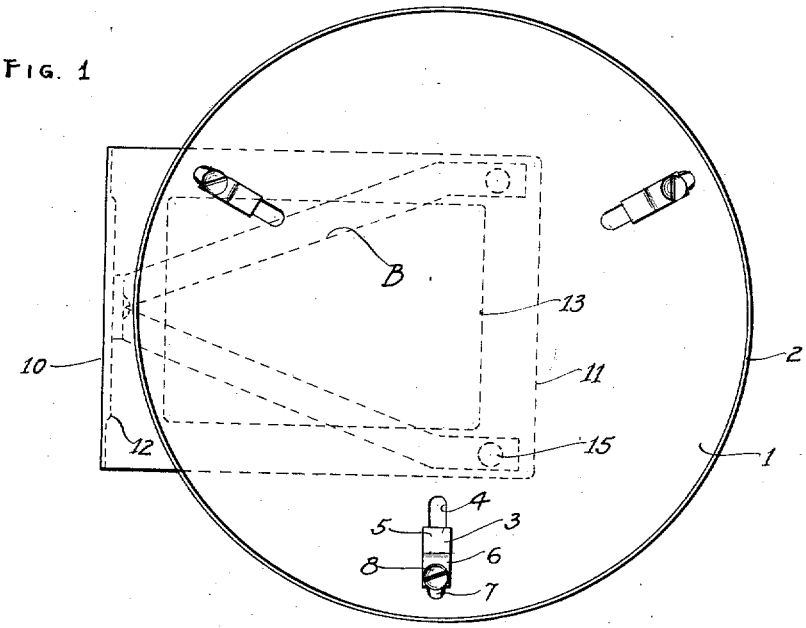
Figure 2:
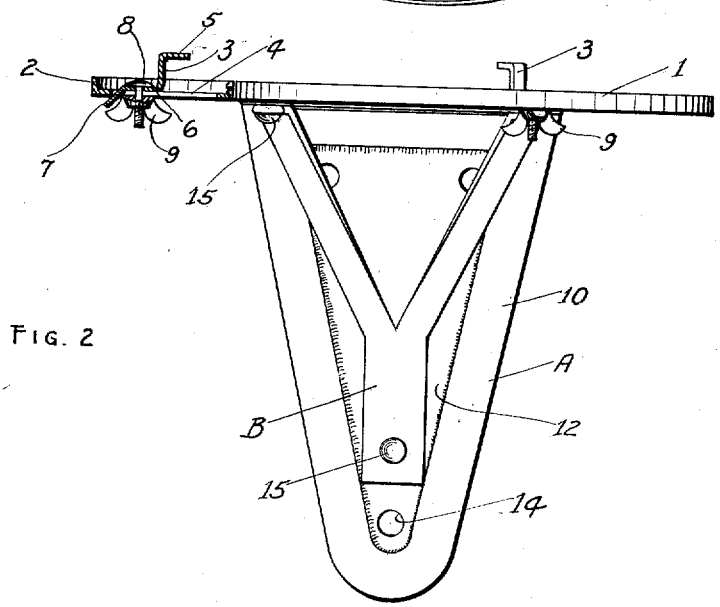

In the drawing, wherein like reference characters indicate like or corresponding parts throughout the views, Figure 1 is a top plan view of my improved device; and Figure 2 is a front, vertical elevation of the same, with certain of the parts broken away and shown in section.

In the drawing, wherein I have illustrated the preferred embodiment of my invention, the device consists of three main parts, these parts being the platform, shelf or disk 1, the supporting bracket A, bent to the angle-shape shown, and a reinforcing brace element B, extending diagonally between the legs of the bracket.

The disk 1 is preferably of sheet metal, pressed or otherwise suitably formed into the desired shape and size, and which may be provided with an upwardly directed flange 2 extending about the periphery thereof. The diameter of the disk depends entirely upon the particular object for which the bracket is to be used, and where it is used for supporting an electric fan, the size must, of course, be such that the base of the fan will nicely fit thereon. In order to more securely hold the fan or other object in the desired position upon the platform, and to permit of the ready removal of the latter therefrom, I have provided one or more clips 3, each slidably movable in and along slots 4 provided through the bottom or supporting wall of the platform, and in the present instance these slots extend radially of the center of the disk.

Each of the clips or clamping elements is in the form of a member, having top and bottom substantially parallel legs, 5 and 6 respectively, connected by a substantially vertical spacing web. The leg 6 is somewhat wider than the width of the slot 4, so that the clip will not fall therethrough, but may be slid therealong. Means are provided to prevent rotation of the clips relative to the disk, by any suitable means, such as by providing a tail or extension portion 7 formed at the free end of each of the lower legs 6, these tails extending downwardly and outwardly and being sufficiently narrow and preferably tapered, so that they will extend through the co-operating slot 4. A screw 8 extends through the lower leg of each clip and is of such length that it will project through the slot and be engageable by a threaded wing nut 9, as shown. It is obvious that these clip elements may be adjustably moved longitudinally of the slots and be removably held at desired positions therealong.

The bracket per se, A, is preferably formed of sheet metal of the desired size, shape and thickness, and bent at right angles to provide a pair of leg portions 10 and 11. It is to be noted that these leg portions, and especially the horizontal leg portion 11, is rather wide, to thereby engage with and support the disk or platform adequately. The vertical leg is indicated as substantially triangular and the horizontal leg as rectangular in shape, and are provided with offset portions 12 and 13 respectively, of similar shapes, to thereby reinforce the same. Apertures 14 may be provided through the vertical leg portion 10, in order that screws or other fastening means may be used for mounting the device to a wall.

The brace element B, is substantially in the shape of the letter Y, the lower leg or base being secured to the vertical leg 10 of the bracket, adjacent the bottom of the latter, and thence extending diagonally upwardly and outwardly, each of the forked ends of the brace engaging the under surface of the horizontal leg 11 of the bracket, adjacent the free outer end of the latter. The parts may be suitably secured together to make a rigid, immovable unit, as by welding, riveting or the like, and in the drawing I have shown the rivets 15. The upper rivets extend through the three co-operating elements, namely the disk, bracket and brace, making a firm and effective joint.

The device just described is particularly intended for adjustably supporting an electric fan, but it is obvious that not only may other electrical devices be supported thereon, but when the bracket is not being used for such uses, as between seasons, it may be used to support flower pots, statuary, loud speakers, or other desired ornamental or artistic objects thereon, and there will be no likelihood of these objects falling off, because if they can not be clamped thereon by the clips, the flange 2 will prevent their sliding off.

Having thus described my invention it is obvious that various immaterial modifications may be made in the same without departing from the spirit of my invention; hence I do not wish to be understood as limiting myself to the exact construction, arrangement and combination of parts herein shown and described, or uses mentioned, except as limited by the claims.

What I claim as new and desire to secure by Letters Patent is:—

1. In a bracket of the kind described, the combination of a bracket, an article-supporting disk carried thereby and provided with slots therealong, article-clamping elements formed of stamped sheet metal and provided with a hole through each to receive a clamping bolt, and clamping bolts through said holes to hold said elements at desired positions along said slots and preventing their rotation relative thereto.

2. In a bracket device of the kind described, the combination with an article-supporting disk having slots therealong, of article-clamping elements formed of stamped sheet metal each having a hole therein, clamping bolts engageable through said holes and whereby said elements may be held adjusted along said slots, and means associated with said elements to limit their rotation relatively of said slots.

This specification signed this 24th day of June, 1931, at Jersey City, New Jersey.

JACOB LANDAU.